United States Patent [19]

Beard

[11] Patent Number: 5,155,510
[45] Date of Patent: Oct. 13, 1992

[54] DIGITAL SOUND SYSTEM FOR MOTION PICTURES WITH ANALOG SOUND TRACK EMULATION

[75] Inventor: Terry D. Beard, Westlake Village, Calif.

[73] Assignee: Digital Theater Systems Corporation, Westlake Village, Calif.

[21] Appl. No.: 811,711

[22] Filed: Dec. 20, 1991

Related U.S. Application Data

[63] Continuation-in-part of Ser. No. 620,825, Nov. 29, 1990.

[51] Int. Cl.$^5$ .............................................. G03B 31/02
[52] U.S. Cl. ....................................... 352/27; 352/37; 352/92; 352/236
[58] Field of Search ................... 352/26, 27, 29, 30, 352/37, 92, 236

[56] References Cited

U.S. PATENT DOCUMENTS

| | | | |
|---|---|---|---|
| 3,932,032 | 1/1976 | Weinstein | 352/26 |
| 4,461,552 | 7/1984 | Levine | 352/27 |
| 4,504,130 | 3/1985 | Bell et al. | 352/92 |
| 4,600,280 | 7/1986 | Clark | 352/272 |

Primary Examiner—Monroe H. Hayes
Attorney, Agent, or Firm—Koppel & Jacobs

[57] ABSTRACT

A signal conditioner is provided for the output of a digital sound source in a dual digital/analog motion picture theater sound system so that the digitally derived audio signal emulates the analog sound track signal. This allows the digital source to be easily integrated into the overall sound system, without displacing the existing analog sound track system. The theater sound playback mechanism is provided with the conditioned audio signal when the digital sound source is actuated, and receives the analog sound track signal at other times. The conditioning circuit includes an adjustable impedance to match the current from the digital sound source to the current from the analog sound track reader, a high frequency variable signal adjuster that is complimentary to a high frequency emphasis built into the theater playback system, and an optional subwoof output.

14 Claims, 8 Drawing Sheets

DIGITAL SOUND SYSTEM FOR MOTION PICTURES WITH ANALOG SOUND TRACK EMULATION

RELATED APPLICATION

This application is a continuation-in-part of application Ser. No. 620,825, filed Nov. 29, 1990 by the present inventor for "Motion Picture Digital Sound System and Method".

BACKGROUND OF THE INVENTION

1. Field of the Invention

This invention relates to digital sound systems for motion picture films.

2. Description of the Prior Art

Current motion picture films employ analog sound recording techniques. Most motion pictures use an analog optical sound track that is printed onto the film along with the picture, and is optically scanned to reproduce the sound. Another technique is to record the sound onto magnetic strips that are coated along the edges of the film; this process is used for example in producing "Dolby ® 70 mm Sound".

Optical sound tracks can become dirty and produce a noisy output. Magnetically recorded sound tracks are subject to noise problems similar to those encountered with other audio tapes. It would be highly desirable to upgrade the quality of motion picture sound to a level comparable to that achieved with a compact disc.

The majority of multitrack motion picture theaters are designed to exhibit Dolby stereo-optical films. This is a two track optical sound format that provides left and right analog sound tracks with derived center and surround tracks. The sound tracks for this format are recorded as two "dual bilateral" variable area tracks in the conventional optical track area of the motion picture release print. During the motion picture post production sound mixing process the sound tracks are mixed through a two-track matrixing device that allows the sound mixers to hear exactly how the left, right, and derived center and surround tracks will sound in a stereo-optical theater; this is the current standard method of mixing motion picture sound tracks.

Although the dual tracks are recorded using noise reduction techniques such as Dolby type A, they have a dynamic range that is significantly less than that of magnetic or digital tracks. The dual tracks are also susceptible to all of the well known failings of optical sound tracks, including a limited frequency response and a susceptibility to noise caused by dust on the film. In addition, the film exposing and developing steps used to produce the optical sound tracks are quite variable, resulting in an optical sound track quality that can vary dramatically. However, the majority of all current motion pictures are released with this standard type of sound track.

It has previously been proposed to replace the analog optical sound track with a digital sound track that digitally encodes the sound. Although theoretically this could be used to give a higher quality sound reproduction, it would be quite expensive to both record the numerous small digital data bits and to provide equipment for reading them back, and the tightly compacted data could give rise to its own noise problems. In addition, it would be difficult to reliably print such digital tracks using conventional film laboratory methods. There would also be a limit to the number of sound tracks that could be encoded onto the film. Since the digital track preempts the normal analog optical sound track two kinds of prints would have to be made and distributed, one with a digital sound track and the other with an analog sound track; if a digital print were sent to a theater without digital play capability, it could not be shown. Furthermore, a theater playing a digital print would have no backup in case of a failure of the digital reader.

SUMMARY OF THE INVENTION

The present invention seeks to eliminate the above limitations of the stereo-optical motion picture sound process, while keeping the format and interface compatible with standard stereo-optical motion picture theaters.

This is accomplished by recording along with the normal stereo-optical track a timecode track that identifies the location in the movie, and using this timecode to synchronize a second source of digital audio signals that is free of the limitations of the analog stereo-optical sound track. The digital audio signal is conditioned so that it can be injected directly into the photocell inputs of a convention stereo-optical theater system. For this purpose the signal is preequalized to compensate for the high frequency emphasis built into the theater's stereo-optical sound playback system.

The digital source is made to behave electrically like an analog photocell source which is essentially a current source, by preferably by providing the digital audio signal as a large signal through a large impedance into the photocell playback system's inputs. The impedance is adjustable, allowing the current from the digital source to match the current from the analog sound track photocells. This in turn makes it possible to use the digital audio system with no adjustment of the theater's sound playback systems. It also provides automatic failsafe protection, since if either the digital or the analog system fails the other can be used with no adjustment of the theater system. In keeping with this a simple switch can be used to select between the digital audio signal and the normal photocell stereo-optical system at the photocell input of the theater's stereo-optic playback system.

These and other features and advantages of the invention will be apparent to those skilled in the art from the following detailed description, taken together with the accompanying drawings, in which:

DETAILED DESCRIPTION OF PREFERRED EMBODIMENTS

The present invention provides a way to have digital audio in addition to a normal analog optical sound track on a motion picture film, and to be able to switch between digital and analog sound inputs to the theater playback system without having to adjust that system.

In the preferred embodiment of the invention a time code track is provided on the film to synchronize an outside digital sound source to the picture. The time code is positioned on the film so that it does not interfere in any way with the conventional optical sound track or with the picture, is highly reliable and easy to record, and can be printed with normal film laboratory equipment and within normal laboratory standards.

The time code is placed in an area on the print between the normal optical sound track and the picture. This area conventionally serves to isolate the optical sound track area from the picture, and is normally deliberately avoided when printing the sound track. It lies within the area exposed by the laboratory sound track printing head but outside the area exposed by the normal laboratory picture printing head. It lies well outside the area scanned by the normal optical sound playback head on a projector so that it does not interfere with the normal optical sound track.

Figure 1:
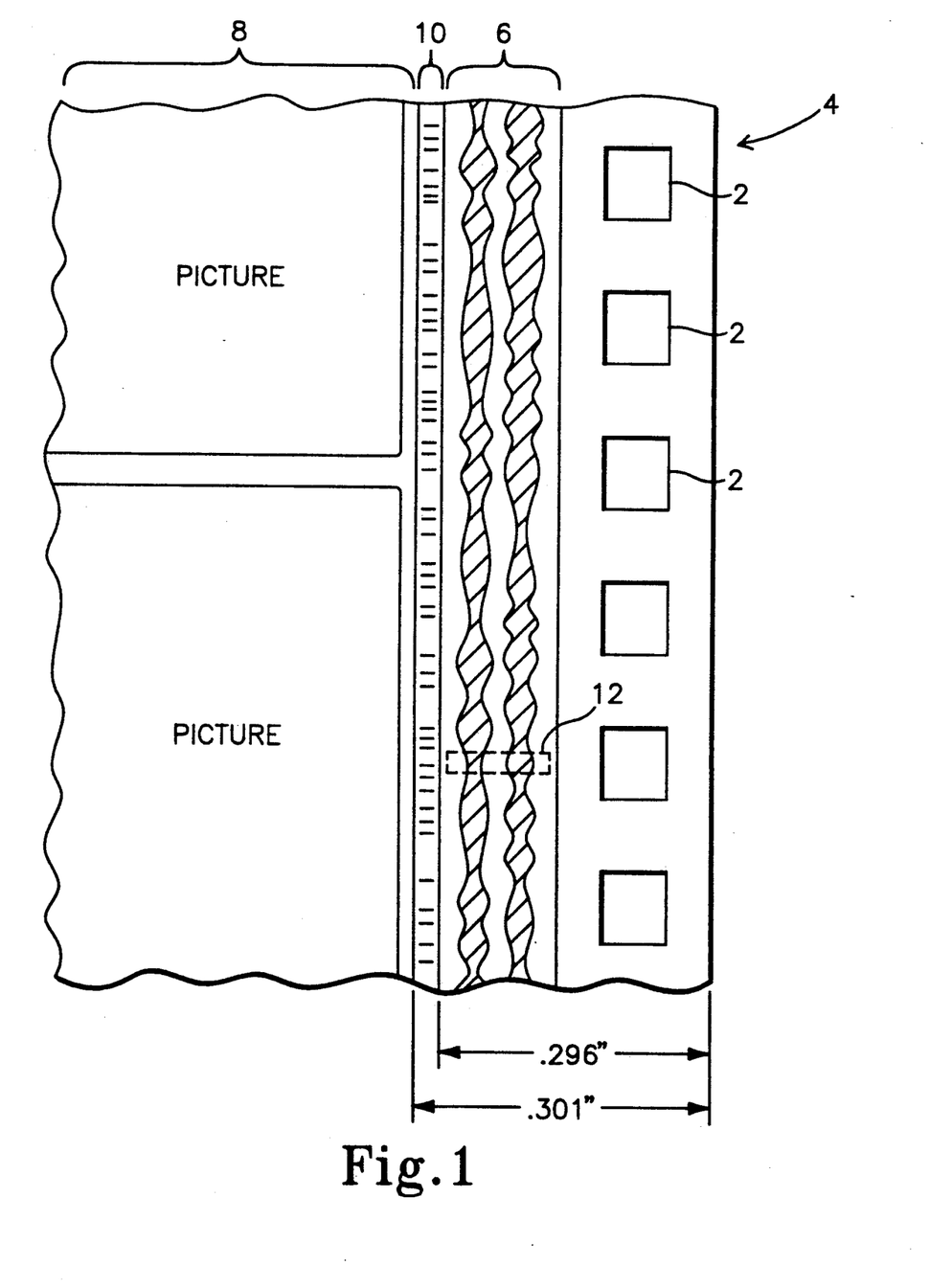
FIG. 1 is an enlarged fragmentary view of a motion picture film segment that includes both a conventional analog sound track and a digital time code.

A piece of 35 mm release motion picture film that carries the new digital time code is shown in FIG. 1. A series of sprocket holes 2 lie between the edge 4 of the film and the normal optical sound track area 6. The picture frames are printed by a picture printing head in an area 8 that is spaced inward from sound track area 6. The intervening area 10 is used for the digital time code of the present invention. This area is exposed by the normal laboratory sound track printing head, but not by the picture printing head.

Color film such as that shown in FIG. 1 is normally formed with three light sensitive silver halide layers corresponding to red, green and blue light. Colored light from the negative exposes the layers, which are then developed. During development, dyes are released within the layers corresponding to yellow, magenta and cyan. However, the theater lamp used to play back the optical sound track is incandescent, emitting infrared radiation to which the color dyes in the film are transparent. Accordingly, after normal color processing and before the final fix the sound track area 6 is redeveloped by an "application" process back to silver. The redeveloper is either rolled or sprayed onto the sound track area. This process is not precisely controlled, but it is important that the redeveloper not extend into the picture area, since this would in effect blacken it. Accordingly, the area 10 is normally left vacant as a buffer zone to separate the optical sound track from the picture frames.

Conventions have been established within the film industry for the division of 35 mm film into its various functional areas. The edge of the picture frame area 8 that is exposed by the picture aperture extends to 0.304 inch±0.002 inch from the film edge 4. In exhibition projectors a slit, indicated by dashed line 12, limits the width of the optical sound track scanning so as to avoid sensing light passed through the sprocket holes 2 or picture area 8. Because the sound track scanners in film projectors are sensitive to infrared light, release print sound tracks are redeveloped as described above, producing an optical sound track whose dark areas are opaque to infrared light. The projector slit extends away from film edge 4 to a limit of 0.286±0.001 inch so as to avoid any unapplicated areas, and the optical sound track is accordingly limited to the area read by the slit. The area from 0.287 to 0.302 inch from film edge 4 is thus available for recording the digital time code of the present invention. This area is normally considered unusable for either picture or sound printing, since an unpredictable part of it is redeveloped and the remainder is not.

The preferred area used for the digital time code extends from 0.296 to 0.301 inch from film edge 4, providing a 0.005 inch wide time code track. Removing the time code track 0.010 inch from the area scanned by the optical sound track slit in the projector eliminates any chance of cross-talk into the normal sound track. Because the time code track occupies an area that is sometimes redeveloped, sometimes not redeveloped, and sometimes only partially redeveloped, where it appears as a clear code on an otherwise opaque track, it cannot be read reliably with an infrared (unfiltered incandescent) light source such as that used to read the optical sound track. Instead, the time code should be read using a light source which emits energy absorbed by the dyes in color film. A light emitting diode or a filtered incandescent source can be employed for this purpose.

The time code is a digital data string that uniquely identifies the location along the film. The code preferably comprises a 24-bit digital word, with the time code word beginning with a synchronizing series of bits.

Figure 2:
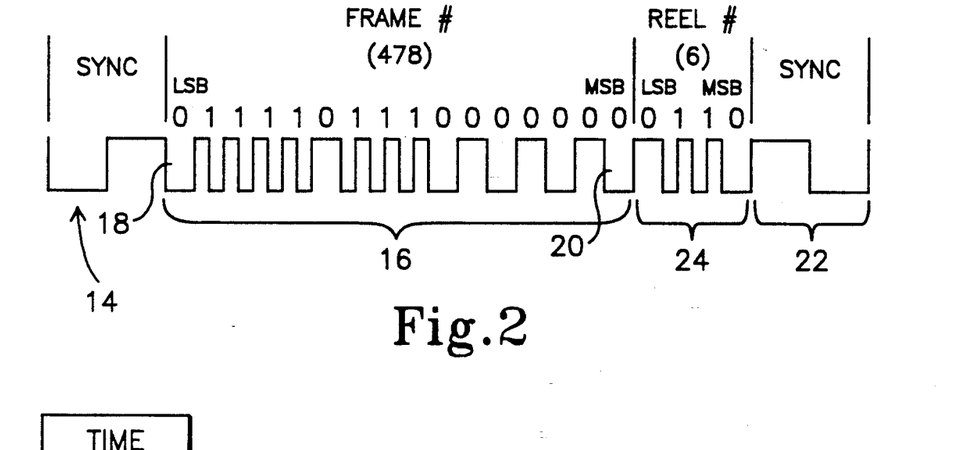
FIG. 2 is an illustration of a digital time code that can be used to identify locations on the film.

An example of one frame of a suitable time code is shown in FIG. 2. This is the time code word for frame number 478 on reel number 6. A sync signal 14 for the frame is provided at the beginning of the time code word. The frame number is identified by a 16-bit binary word 16, with the least significant bit position identified by numeral 18 and the most significant bit position by numeral 20. This is followed by a 4-bit word 24 that identifies the reel number, and then a sync word 22 for the following frame. The type of coding illustrated is known as biphase mark coding, and is self-clocking. A constant level (either "high" or "low") during a given bit indicates a digital "0", while a transition between two levels (either high to low or low to high) is a digital "1".

There may be a direct correspondence between the time code frames and the picture frames, i.e., each time code frame locates a particular picture frame. This is not necessary, or in fact the optimum arrangement. The spacing of the time code frames can be selected somewhat arbitrarily, since its function is to provide an indication of location along the film at any given time. Whereas 35 mm film is normally played at 24 picture frames per second, it is advantageous to use a 30 frames per second time code because a 30 frame rate is more easily "synced" with conventional digital audio tape machines when mastering the sound track.

Figure 3:
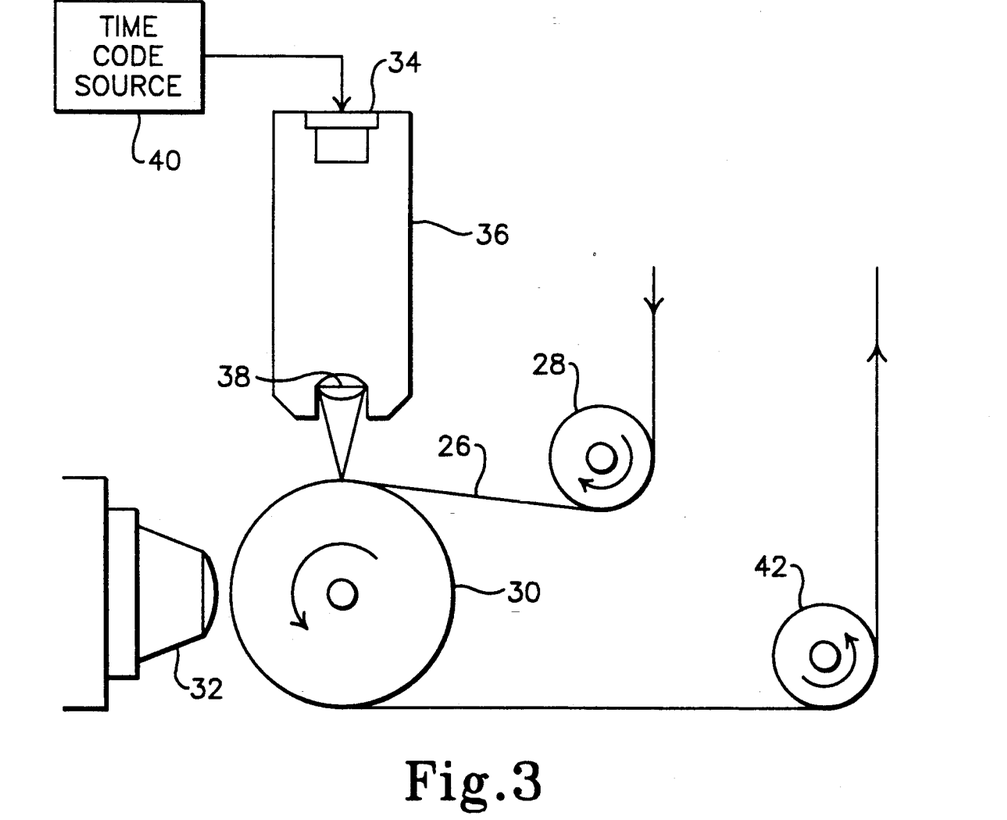
FIG. 3 is a simplified assembly drawing showing a system for recording both the digital time code and an analog sound track on a movie film.

FIG. 3 shows a system for recording both the digital time code and the analog sound track on the film sound track negative. The negative film 26 passes over an idler roller 28 on its way to an inertial sound drum 30. The normal analog sound track is exposed onto the negative through lens assembly 32. The digital time code is exposed onto the optical sound track negative at the same time the sound track negative is being recorded. A light source 34 is positioned at one end of a housing 36 and emits radiation that is focused by a lens 38 at the other end of the housing onto the time code portion of the film. Light source 34 is preferably a high efficiency green light emitting diode (LED), such as an AND, Inc. 180PGP diode. The LED is imaged directly onto the sound track negative film by lens 38, preferably as a 0.005 inch diameter spot. The LED is turned on and off in response to the time code signal to be recorded, which is provided by a suitable digital time code signal source 40. The time code is exposed on the film in a location that will be proximate to the corresponding picture on the film print. The analog optical sound track for that portion of the film is then recorded when the film is passed under recording head 32. The film is removed via an idler wheel 42 for normal application redevelopment.

Figure 4:
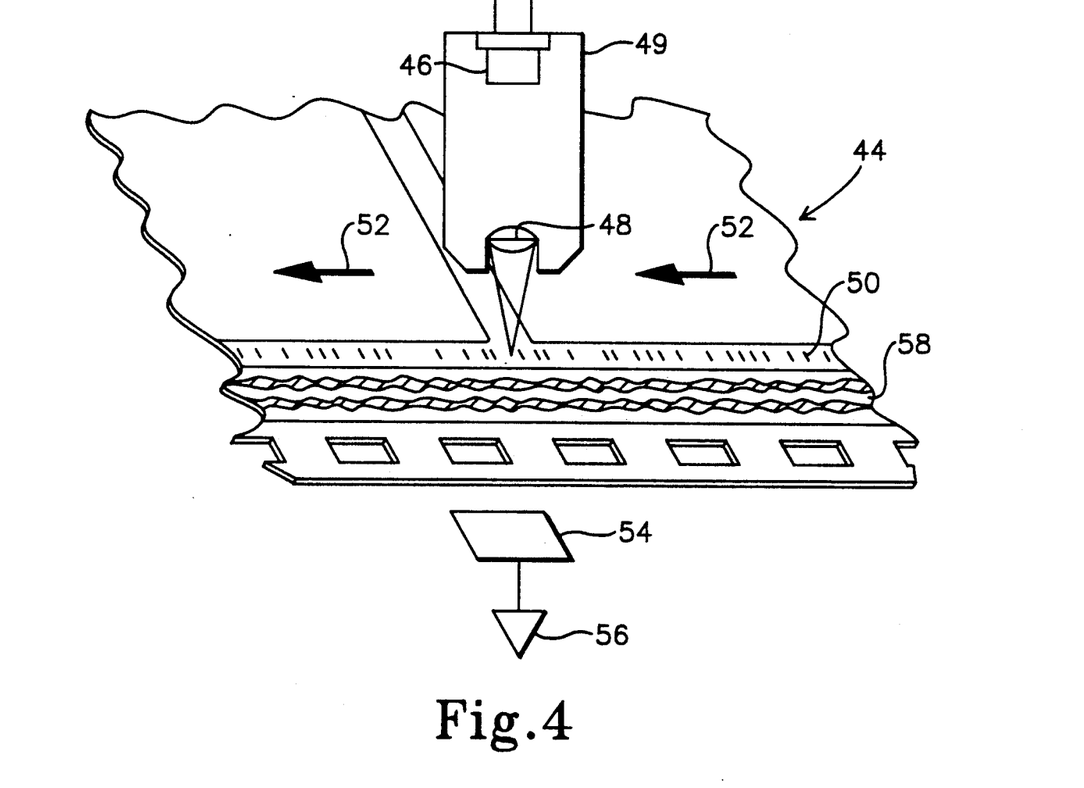
FIG. 4 is a simplified fragmentary perspective view showing a system for reading the digital time code from the film.

A time code playback system is illustrated in FIG. 4. The release film print 44 passes under a time code reading head before advancing to the projector aperture. The reading head illuminates the digital time code area with light that is absorbed by the developed film dyes. A high efficiency red LED 46, such as an AND, Inc. 180CRP device, is preferably used for this purpose. The LED 46 is imaged onto the time code track by lens 48, preferably as a 0.005"×0.010" rectangular spot; both the LED 46 and lens 48 are held in a common housing 49. With the standard 35 mm film described above, this allows for reading the time code with up to 0.005 inch film weave. The time code track is indicated by numeral 50, with the film moving in the direction of arrows 52.

Light passing through the time code track 50 falls upon a photocell 54, the output of which is amplified by amplifier 56 to provide the digital time code signal used to control audio playback. With the preferred film dimensions described above in connection with FIG. 1, reading of the time code 50 is unaffected by the analog sound track 58.

Figure 5:
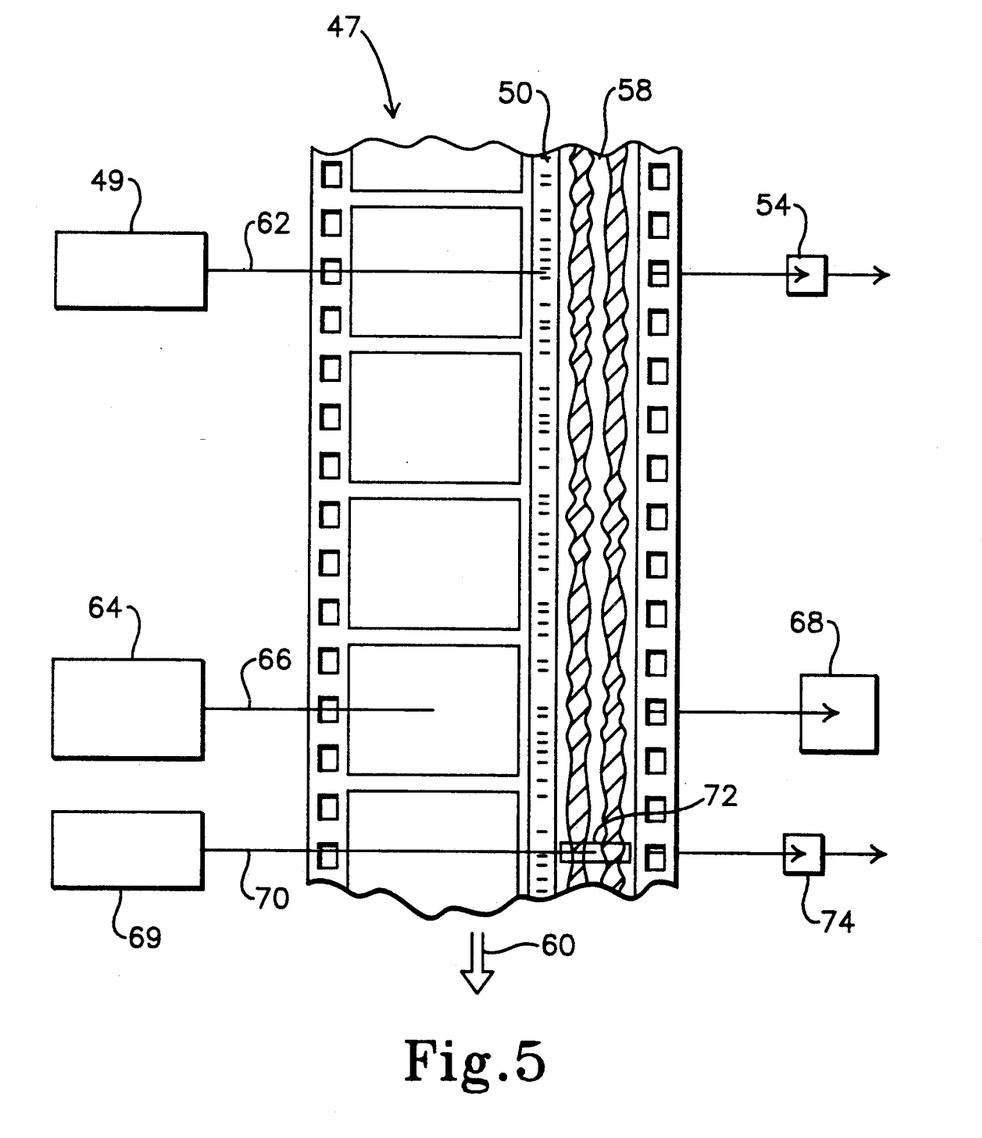
FIG. 5 is a block diagram illustrating a dual digital-/analog reading system for the digital time code and analog sound track.

FIG. 5 illustrates the sequence in which the print film 44 which has been recorded as shown in FIG. 4, is read during theater projection. Assume the film is moving past the projection facilities in the direction of arrow 60. It first passes the digital time code reading head in housing 49, which reads the time code with a colored beam 62 that strikes detector 54 on the opposite side of the film. The film then advances to projection lamp 64. A beam 66 from lamp 64 projects the picture frames onto the theater screen 68. The film then advances to a third source 69, whose beam 70 is transmitted through a slit 72 over the optical sound track area 58 and onto a detector 74, which produces the normal analog audio signal.

In normal operation, either the digital time code 50 or the audio sound track 58, could be read. FIG. 5 illustrates the independence of the two sound mechanisms, and that neither one interferes with the other. In case of a failure somewhere in the digital system, the analog sound track can be used as a backup. In theaters where no digital reading facilities are available, only the analog sound track would be utilized.

It should be noted that the picture frames are illuminated by the projection lamp 64 a predetermined period of time after their respective time codes have been read, as determined by the spacing between time code lamp housing 49 and projector 64, and the film speed. This allows time for processing the time code signal, and for checking its validity and accessing the proper digital audio data in the fast random access buffer memory. Processing of the time code signal and the production of sound therefrom is synchronized with the illumination of the picture frames so that the frames are displayed on the screen at the same time the sound derived from their respective digital time codes is played in the theater.

Figure 6:
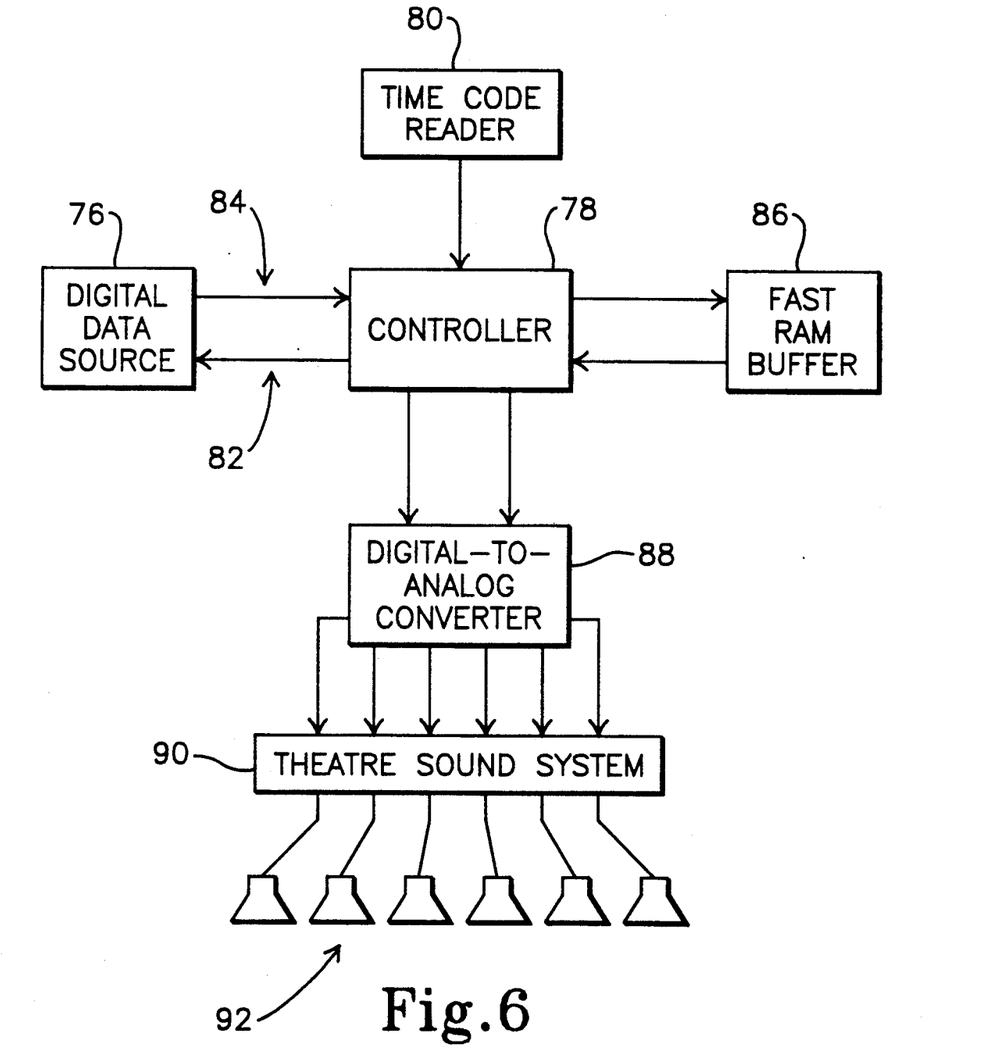
FIG. 6 is a block diagram of a system for processing time codes read from a film into an audio signal.

A system that can be used to produce an audio output in the theater in response to the recorded digital time code is shown in FIG. 6. Digital audio data for the entire movie is stored in a large capacity high reliability archival digital data source 76. The digital audio data is preferably stored in a compressed form using a method such as that described in U.S. Pat. No. 4,882,585 by the present inventor, issued Nov. 21, 1989 for "Method and Apparatus for High Resolution Analog-Digital-Analog Transformations". This compression allows more time and more channels of audio information to be recorded in the same amount of space. Other digital audio data compression techniques could also be used. The archival digital data source may be one or more disk drives, digital audio tape (DAT) drives such as the Sony Corp. Model SDT 1000 or CD ROM drives. A multi-track audio source to be recorded may come from either a multi-track digital or analog tape machine. In the case of a digital tape machine, the digital data can be transferred directly. If an analog audio source is used, the analog data is converted to digital form by conventional analog-digital conversion, using an analog-digital converter such as the Crystal Semiconductor Model CS 5326. The sampling clock in the converter is phase locked to the tape master to assure synchronous recording. The sample frequency can be the standard 44.1 KHz or 48 KHz that provides 20–20 KHz frequency response.

The entire recording process is preferably managed on an IBM-compatible microcomputer system. The digital data is transferred from the analog-to-digital converters used to convert the audio data to digital format to a hard disk drive, via an SCSI data system in the computer. The digital data is addressed in blocks that are matched to the time coded words of the digital time codes recorded on the motion picture print. The data can then be transferred to DAT tapes which can be used to make duplicate DAT tapes, CD ROMs or other digital archive storage, such as magneto optic discs, 8 mm digital tapes, or optical tape.

Returning to FIG. 6, a microprocessor controller 78 receives the time code data from the time code reader 80 (shown in more detail in FIG. 4). The film travel time from the location of the time code reader head to the projection aperture is set in the controller so that the time for converting the digital audio data originally stored in data source 76 to an analog signal is known exactly.

The controller 78 accesses digital data source 76 via access line 82, and causes it to transfer digital audio data in anticipation of its being required via data channel 84 to a fast random access buffer memory 86. The digital data is stored by the controller in the buffer memory 86.

With an IBM AT ® base system, several megabytes of RAM storage can be provided for this purpose. Use of this large intermediate rapid access memory is an important feature of the invention. The large fast access buffer allows instantaneous jumps within it to maintain synchronous sound when parts of the motion picture have been lost in editing or at projector "changeovers". The microprocessor system anticipates the data that is apt to be required and transfers it in block from the slower non-random access archival source. The digital audio data is transferred from the digital data source 76 into the memory 86, where it is stored for several seconds before being retrieved and transferred to a series of digital-to-analog converters 88. This allows the system to accommodate projector changeovers and unexpected jumps in the motion picture that can occur if some frames of the movie are damaged in projection and subsequently removed. In such event the controller rapidly accesses the buffer to obtain the necessary digital audio data for delivery to the digital-to-analog converters 88. Because of the buffer action of memory 86, the digital data source 76 can have relatively slow random access properties, making it practical to use devices such as CD ROM or DAT as the digital data source.

Figure 7A:
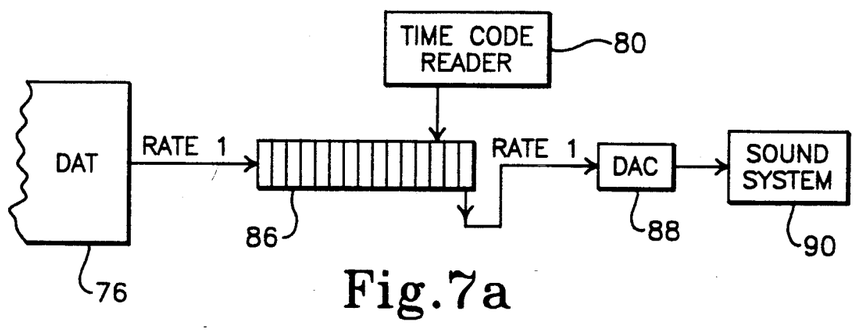
FIGS. 7a-7c are block diagrams illustrating the virtual memory operation when a jump is detected between successive time code words.
Figure 7B:
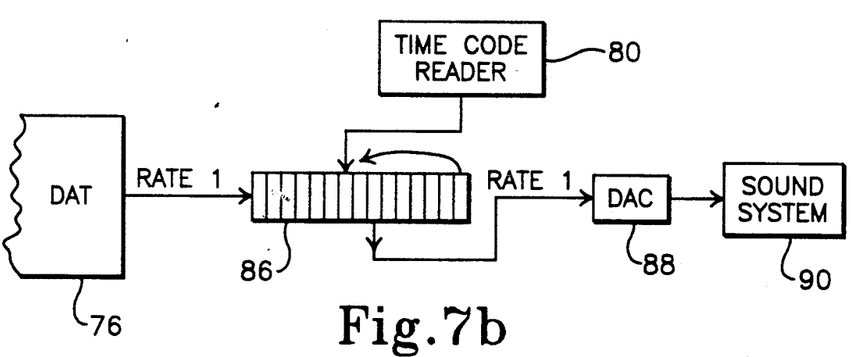
Figure 7C:
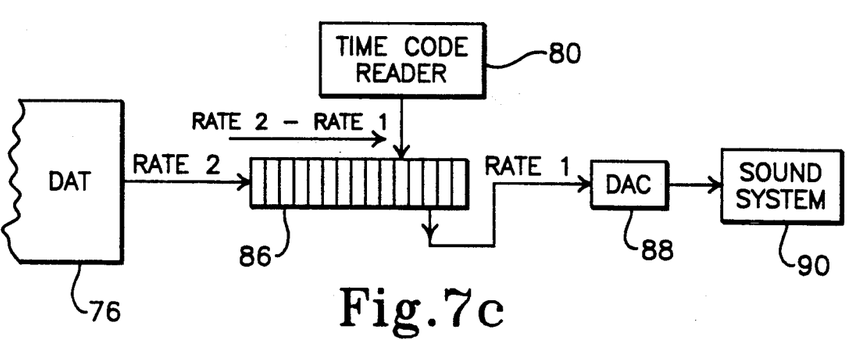

The ability of the system to accommodate jumps in the normal sequence of time code frames is illustrated in FIGS. 7a–7c. At any given time the buffer 86 will hold the audio data for the time code frame currently being played, the audio data for as many subsequent sequential time code frames as is desired and for which there is sufficient buffer capacity, and also previously read time code frames if an ability to reverse jump is desired. In FIG. 7a, the buffer 86 is illustrated as holding the audio data for the time code frame currently being read by time code reader 80, plus the audio data for all of the subsequent time code frames up to the buffer's capacity. For example, for a six channel system operating with a 48 KHz sampling rate and the digital data reduction method of U.S. Pat. No. 4,882,585, a 16 megabyte RAM will provide approximately one minute of buffer memory. The data moves from left to right through the buffer 86. Current audio data is read out to the DACs 88, after the built-in delay established by the film travel time between the time code reader head and the projection aperture, for application to the theater sound system 90, at the same average rate that anticipatory future data is fed into the buffer from the digital archive source 76. Since data is transferred from the archive source to the buffer at a faster rate than data is read out of the buffer, the archive source periodically pauses while data is being read out from the buffer, and restarts to fill the buffer back up.

In FIG. 7b, the time code reader 80 sees a break in the time code sequence, with a jump from one time code frame to a later frame, skipping a number of intermediate frames. The buffer readout system responds with the same jump, skipping virtually instantaneously to the audio data which corresponds to the new out-of-sequence time code frame. At this instant data is still being read out of buffer 86 at the same average rate data is written into the buffer from source 76.

The system's subsequent accommodation to the jump is illustrated in FIG. 7c. The maximum archive source data output rate is greater than the buffer data output rate, so that new anticipatory data is written into the buffer faster than current data is read out. For example, for a sampling rate of 44,100 samples/second, the buffer data out rate could be 264.6K bytes/second and two DAT's maximum data out rate 366K bytes/second. The differential in data flow rates continues until the buffer is again storing its full anticipatory capacity, at which time the DAT data output average rate reverts to that of the output of the buffer to the DACs.

Again referring to FIG. 6, the digital-to-analog converters 88 convert the digital audio data to output analog signals, preferably in the form of 6 full bandwidth 20–20 KHz outputs. The analog output signals are passed directly to the audio inputs of the theater sound system 90 which feeds speakers 92.

The buffer time provided by memory 86, and the fact the time code is read prior to the projection aperture, also allows various software routines to be performed to assure the validity of the time codes that are read, and to correct for possible system or film errors. For example, an internal timer within the system keeps track of the rate at which the successive frame time codes are read. If no time code signal is received at the time expected, the internal timer may be used to play the audio signal corresponding to the next expected time code. The buffer time may also be used to validate new time codes when there is a jump in the time code sequence. For example, assume that the time codes 35, 36 and 37 are read initially, followed by a jump to the time codes 265, 266 and 267 because of a film splice. A software routine can be programmed to prevent the audio signals for the second series of frames from being played unless at least two sequential valid frames in the new series are read.

An important feature of the two track version of the invention is that it can be connected directly into an existing conventional Dolby ® theater stereo-optical system, without having to provide a separate capability for analog sound track play. The invention thus complements the Dolby system, rather than replacing it. This simplifies the process for installing the digital system in an existing theater, and greatly reduces its cost.

Figure 8:
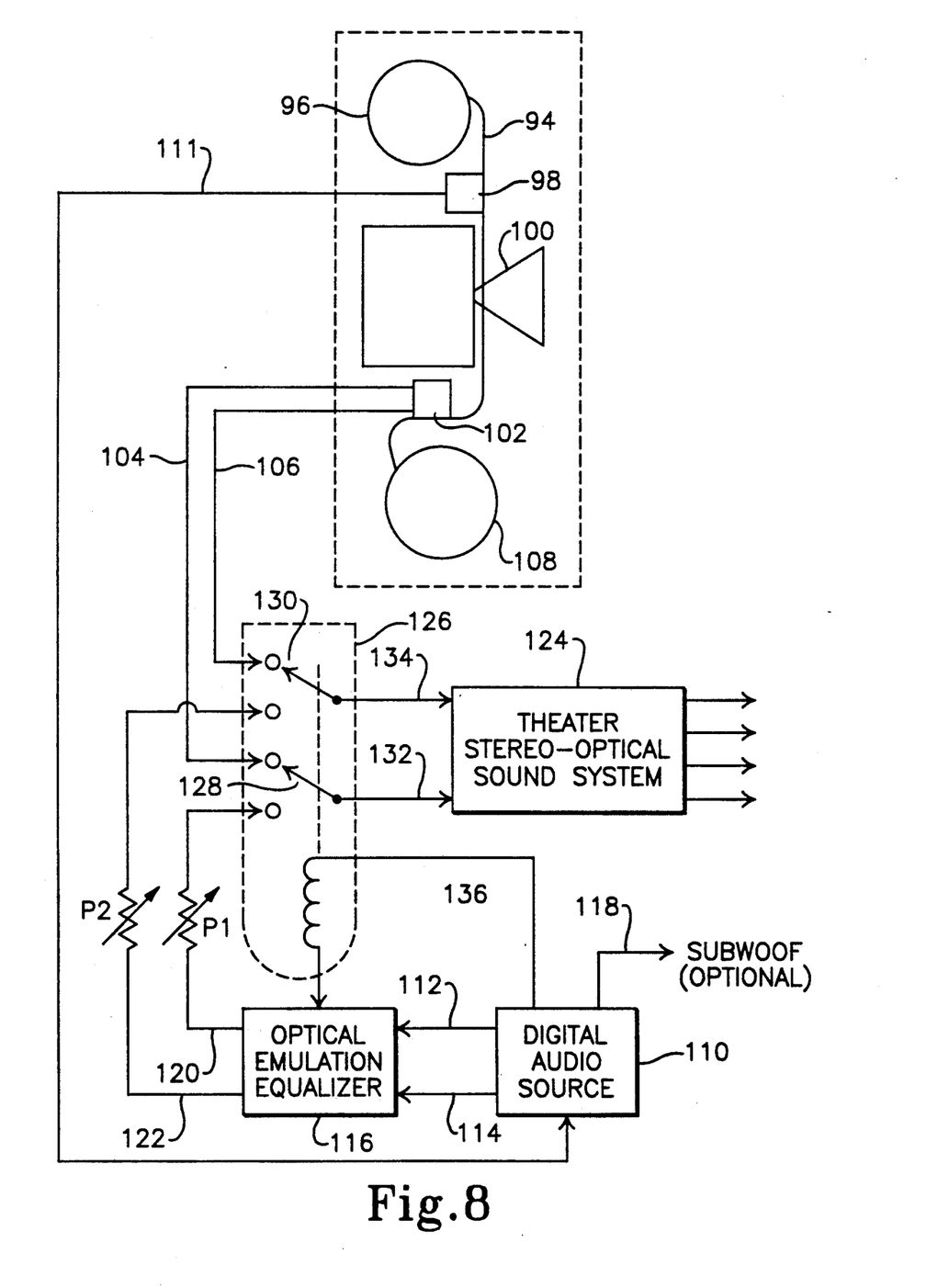
FIG. 8 is a block diagram of a motion picture theater sound system in accordance with the invention in which a digital audio source can be substituted for an analog sound track signal without adjusting the audio playback mechanism.

FIG. 8 is a block diagram of a theater sound system in which a new digital capability has been added to an existing analog sound system. The theater projector is shown enclosed in dashed box 92. A motion picture film 94 from a film reel 96 passes through a timecode reading head 98 and continues on to the projection aperture 100, from which the picture is projected onto the theater screen. After the projector aperture 100 the film passes through an optical sound head 102 having left and right channel photocells that are connected to output lines 104 and 106, respectively. The film then proceeds onto a takeup reel 108. In the optical sound head 102 light is transmitted through the analog sound track's left and right tracks onto respective photocells, which output analog audio signals on lines 104 and 106.

A separate digital audio source 110 receives the timecode signal on line 111 from reading head 98, and uses the timecode signal to synchronize the digital audio version of the sound track to the picture. While the digital audio source is preferably implemented as described above in connection with FIGS. 1–7c, other types of digital audio sources could also be used, such as a complete digitally encoded sound track printed directly on the film in conjunction with a reader and digital-to-analog converter.

The digital audio source 110 stores the sound track in digital format, and includes conversion apparatus to convert the digital signals to left and right channel analog audio signals on output lines 112 and 114, respectively. These analog signals are then processed by an optical emulation equalizer circuit 116. This circuit adjusts the signals' frequency characteristics so that, when they are applied to the inputs of the theater stereo-optical sound system that has been adjusted to play the analog optical sound track, the result will be an essentially flat frequency output.

The analog audio signals delivered by the digital audio source 110 to output lines 112 and 114 typically have a desirably flat frequency characteristic. However, the theater's analog stereo-optical sound system is generally designed to emphasize high audio frequencies with greater gains than for the middle frequencies. This is because the analog sound track signals produced by the photocells of the optical sound head 102 are typically attenuated in the high frequency range. The high frequency attenuation is a consequence of the "slit loss" associated with the optical slit employed in the sound head 102 to read the optical sound track. The high frequency response for the optical sound track is limited to about 12 KHz. By contrast, the digital audio source in the present invention is capable of providing an essentially flat frequency response well beyond 12 KHz.

The optical emulation equalizer 116 incorporates a high frequency roll-off to simulate the high frequency attenuation of a typical optical playback head. The equalizer's frequency response is thus generally complementary over the audio range to that of the theater stereo-optical sound system 124. In addition, because the low frequency response of the digital audio source 110 cannot always be passed through a conventional stereo-optical theater system, a separate subwoof output 118 can be provided as an option. This can be connected directly to the theater's subwoof system, or through a relay switch.

The left and right conditioned outputs of optical emulation equalizer 116 are transmitted over lines 120 and 122, respectively, to the theater stereo-optical sound system 124. Potentiometers P1 and P2 are included in lines 120 and 122, respectively, to allow the current magnitude of the equalized audio signal to be matched with that of the optical sound track signal. In this manner the equalized audio signal from digital audio source 110 emulates the analog audio signal from the photocells of the optical sound head 102. The photocells function essentially as a current source. The digital audio source is made to behave like a photocell source by providing the equalized signal as a large (typically a few volts) signal through a large resistor into the photocell inputs of the stereo-optical playback system. For this purpose potentiometers P1 and P2 can range from about 10 kilo ohms to several hundred kilo ohms, depending upon the sensitivity of the photocells used in the particular theater projector.

The theater stereo-optical sound system 124 is provided with an audio input from either the photocells of optical sound head 102 or the digital audio source 110, as determined by a switch mechanism such as relay 126. A pair of switches 128 and 130 are included within the relay, and switch the left and right stereo-optical photocell inputs 132, 134 of the theater stereo-optical sound system 124 between the equalized audio signals on equalizer output lines 120 and 122, and the photocell signals from optical sound head 102 on lines 104 and 106. The theater sound system is preferably switched to the digital audio source 110 whenever that source is active and provides an audio signal in synchronism with the motion picture. This is accomplished by means of a control line 136 from the digital audio source 110 to the relay winding 138. When it is playing, the digital audio source 110 transmits a control signal over line 136 that energizes relay coil 138, causing switches 128 and 130 to connect with the equalized audio signal output lines 120 and 122. Should the digital audio source system fail for some reason, relay 126 relaxes and the signal from the optical sound head photocells on lines 104 and 106 are passed to the theater stereo-optical sound system. The theater sound thus continues without interruption, although with a somewhat poorer quality.

Figure 9:
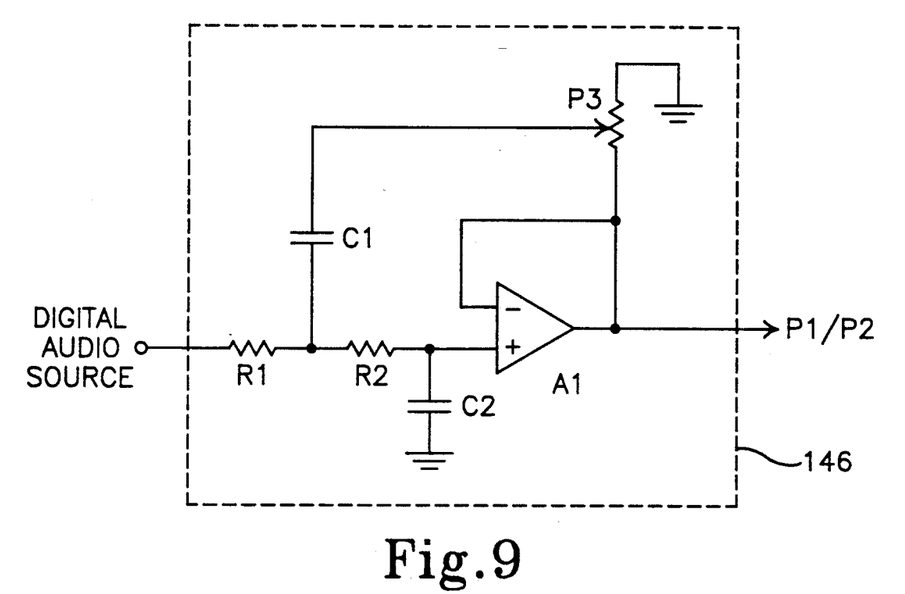
FIG. 9 is a schematic diagram of the optical emulation equalizer circuit used in FIG. 8.
Figure 10:
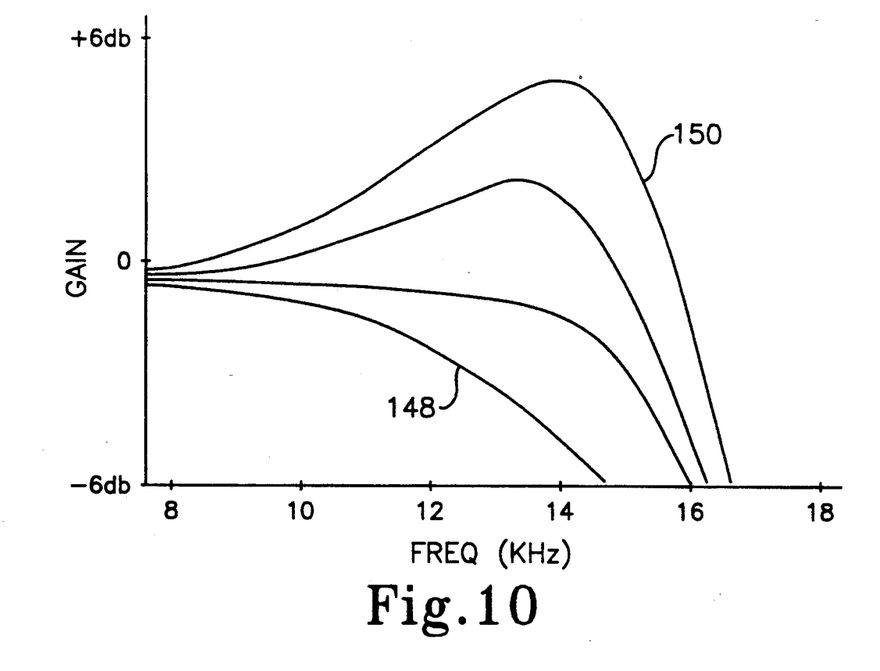
FIG. 10 is a graph of a possible high frequency compensation that can be employed for the optical emulation equalizer circuit of FIG. 9.

FIG. 9 shows an example of a simple equalizer circuit that can be used to implement the optical emulation equalizer 116 of FIG. 1 for either the left or right channel; a similar circuit would be used for the other channel. The circuit uses two-pole designs for the high frequency adjustment which is implemented with a low pass filter 146 consisting of resistors R1 and R2, operational amplifier A1, capacitors C1 and C2 and a potentiometer P3. Adjusting the potentiometer P3 changes the damping of this circuit, and thereby changes its frequency response as illustrated in FIG. 10. Potentiometer P3 can be adjusted between a minimum overdamped response 148 and a maximum underdamped response 150. The various curves converge and are essentially flat for frequencies less than about 6 KHz.

As an alternate to the high frequency adjustment illustrated in FIG. 9, the output of the optical emulation equalizer 116 can be processed through an inverting tuned filter that is tuned to about 12.5 KHz. The inverted output of the tuned filter would then be combined with the optical emulation equalizer to yield a playback output that is flat for about 2 KHz beyond the flat response achieved with the circuit of FIG. 9.

The overall purpose of adjusting the high frequency potentiometer P3 and the series potentiometers P1 and P2 is to have the level and frequency response from the digital audio system be as flat as possible, and to have them emulate a normal photocell input when they are injected into the stereo-optical photocell inputs 132, 134 of a theater stereo-optical sound system 124 that has previously been adjusted for optimum response to the photocell inputs. In this way, switching from the actual photocell inputs to the digital audio source by closing relay 126 is equivalent to switching to a new photocell input with a greatly improved signal-to-noise ratio and frequency response. The digital system is made to mimic a perfect photocell system, without the practical limitations of the optical sound photocell system.

The digital audio system can be simply and inexpensively installed in a theater. The output of the theater's playback system when the digital system is connected is observed with a spectrum analyzer, and the digital system is adjusted to obtain a flat frequency response. The first step is to adjust potentiometers P1 and P2 to obtain a proper current level that emulates the photocell currents. Numerous different kinds of photocells are presently available, with different sizes and current outputs. If the particular projector and photocells used in the theater are known in advance, the digital system can be designed with fixed resistors in place of potentiometers P1 and P2 (although the potentiometers might still be desirable for trimming purposes). When it is not known in advance what type of projector will be encountered, the potentiometers P1 and P2 are used to adapt to any projector. To set the potentiometers, they are connected to the theater stereo-optical sound system inputs 132, 134 and initially set to a mid-range level. An input level meter is included in the Dolby sound system, and the potentiometers P1 and P2 are simply adjusted to center the Dolby input level meter.

The high frequency attenuation of the optical emulation equalizer 116 is then set by adjusting the high frequency potentiometer P3 until the theater sound system reproduces a pink noise digital signal with flat frequency response through the theater's sound system.

The new digital sound system thus allows for a very flexible and reliable playback of digital movie sound while accommodating a normal analog optical sound track on the same film. Since numerous variations and alternate embodiments will occur to those skilled in the art, it is intended that the invention be limited only in terms of the appended claims.

I claim:

1. In a digital sound system for a motion picture theater, the sound system including means for reading a motion picture analog sound track, a motion picture analog sound track playback means, means for supplying a signal read by said reading means from a motion picture analog sound track to said playback means, and a motion picture digital sound source, comprising:
    signal conditioning means for conditioning an audio signal from said digital sound source to emulate a signal supplied by said analog sound track reading means in response to its reading a motion picture analog sound track, and
    means for supplying said conditioned audio signal from said digital sound source to said analog sound track playback means.

2. The digital sound system of claim 1, further comprising means for switching said playback means between said analog sound track signal supply means and said digital audio signal conditioning means.

3. The digital sound system of claim 2, said switch means including means for switching said playback means to said digital audio signal conditioning means when said digital sound source is actuated, and to said analog sound track signal supply means at other times.

4. The digital sound system of claim 1, said signal conditioning means including adjustable impedance means for matching the current from said digital sound source to the current from said analog sound track reading means.

5. The digital sound system of claim 1, wherein said playback means includes a high frequency signal emphasis means, and said signal conditioning means includes a high frequency signal adjustment means that is generally complementary to said high frequency signal emphasis means.

6. The digital sound system of claim 5, wherein said high frequency signal adjustment means includes means for varying its degree of adjustment so that it can be adjusted to complement different degrees of high frequency signal emphasis.

7. The digital sound system of claim 5, said high frequency signal attenuation means comprising a low pass filter.

8. The digital sound system of claim 1, said signal conditioning means further supplying a subwoof output.

9. A digital sound system for a motion picture theater, said theater having a motion picture sound signal playback means with a frequency-dependent gain over the audio spectrum that is generally complementary to the signal characteristic of a motion picture analog sound track reader, comprising:
    a motion picture digital sound source having a generally flat frequency output characteristic over the audio range,
    means for adjusting the output of said digital sound source over the audio range in a manner generally complementary to the frequency-dependent gain of said playback means, and
    means for connecting the adjusted output of said digital sound source to said playback means.

10. The digital sound system of claim 9, further comprising adjustable impedance means for adjusting the output current of said digital sound source, thereby enabling said digital sound source to match the current from a motion picture analog sound track reader.

11. The digital sound system of claim 9, wherein said playback means provides a high frequency signal emphasis, and said digital sound source output adjusting means includes a high frequency signal attenuator that is generally complementary to said high frequency signal emphasis.

12. The digital sound system of claim 11, wherein said high frequency signal attenuator includes means for adjusting its degree of attenuation so that it can be adjusted to complement different degrees of high frequency signal emphasis.

13. The digital sound system of claim 12, said high frequency signal attenuator comprising a low pass filter.

14. The digital sound system of claim 9, said adjusting means further supplying a subwoof output.

* * * * *